(12) United States Patent
Nakayama et al.

(10) Patent No.: US 9,038,839 B2
(45) Date of Patent: May 26, 2015

(54) BOX WITH COMPONENT INTERNALLY HOUSED

(75) Inventors: Makoto Nakayama, Kakegawa (JP); Shinichi Hamaguchi, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 921 days.

(21) Appl. No.: 12/361,571

(22) Filed: Jan. 29, 2009

(65) Prior Publication Data
US 2009/0200298 A1    Aug. 13, 2009

(30) Foreign Application Priority Data
Feb. 1, 2008   (JP) .................................. 2008-022817

(51) Int. Cl.
| H02G 3/08 | (2006.01) |
| H01J 5/00 | (2006.01) |
| H01J 15/00 | (2006.01) |
| H05K 5/00 | (2006.01) |
| H05K 5/03 | (2006.01) |

(52) U.S. Cl.
CPC ..................................... *H02G 3/081* (2013.01)

(58) Field of Classification Search
CPC ................................ H02G 3/08; H02G 3/081
USPC ............................... 220/3.8, 3.94; 174/50, 67
See application file for complete search history.

(56) References Cited

U.S. PATENT DOCUMENTS

| 5,682,016 | A | * | 10/1997 | James et al. | ................... | 174/535 |
| 6,133,531 | A | * | 10/2000 | Hayduke et al. | ................ | 174/67 |
| 6,838,617 | B2 | * | 1/2005 | Shaw et al. | ..................... | 174/50 |
| 7,148,421 | B2 | * | 12/2006 | Nagashima et al. | ............ | 174/67 |

FOREIGN PATENT DOCUMENTS

JP    2003-219539 A    7/2003

* cited by examiner

*Primary Examiner* — Fenn Mathew
*Assistant Examiner* — Andrew T Kirsch
(74) *Attorney, Agent, or Firm* — Sughrue Mion, PLLC

(57) ABSTRACT

A box includes a first cover and a second cover have engaging mechanisms which engage the one end of the first cover to the one end of the second cover, and have retaining mechanisms which retain the other end of the first cover to the other end of the second cover. The first cover and the second cover are fit to each other in a normal state when the engaging mechanisms are engaged with each other and the retaining mechanisms are retained normally. When an engagement between the engaging mechanisms is in an abnormal state, a projection abuts against at least the other of the one end of the first cover and the one end of the second cover so that a gap is formed and the interior component housed in the internal space can be seen through the gap.

4 Claims, 12 Drawing Sheets

BOX WITH COMPONENT INTERNALLY HOUSED

BACKGROUND

This invention relates to a box like an electric junction block such as a relay box, a fuse box or an electric control unit box which is mounted in a vehicle such as a motorcar and incorporates an electric component such as a relay, a fuse or an electric control unit, and more particularly to a box provided with a first cover, a second cover and an interior component housed in an internal space formed when the first cover and second cover are fit to each other and capable of easily detecting the state where one of the first cover and second cover is not correctly assembled with the other thereof (i.e. semi-fitting state).

Traditionally, as the electric junction block mounted in a vehicle, an electric junction block having a waterproof function as described in Patent Reference 1 is known. In the case of this kind of electric junction block, if the cover is not correctly mounted in a complementary member (an electric junction block body or another cover), the waterproof capability will be impaired. So, usually, whether or not the cover is correctly mounted is confirmed by whether or not the cover can be suitably locked.

Patent Reference 1: JP-A-2003-219539

However, even with a structure in which locking cannot usually be done unless the cover is not correctly mounted, as the case may be, if the cover is pushed in with strong force, locking (i.e. engagement) is realized. In this case, even if it is confirmed whether or not the cover is correctly mounted by whether or not the locking can be done, actually, an unsuitable mounting state (i.e. semi-fitting state) may be overlooked.

SUMMARY

This invention has been accomplished in view of the above circumstance. An object of this invention is to provide a box such as an electric junction block which can immediately determine a semi-fitting state by eyes even when the semi-fitting state occurs.

In order to attain the above object, the box according to this invention has the features identified in the following items (1) to (3).

(1) There is a box comprising:
   a first cover;
   a second cover; and
   an interior component housed in an internal space formed when the
first cover and second cover are fit to each other,
   wherein the first cover and the second cover have engaging mechanisms which engage the one end of the first cover to the one end of the second cover, and have retaining mechanisms which retain the other end of the first cover to the other end of the second cover;
   wherein the first cover and the second cover are fit to each other in a normal state in a case that the engaging mechanisms are engaged with each other in a state where the retaining mechanisms are normally retained to each other;
   wherein a projection is provided on at least one of the one end of the first cover and the one end of the second cover; and
   wherein when an engagement between the engaging mechanisms is in an abnormal state, the projection abuts against at least the other of the one end of the first cover and the one end of the second cover so that a gap between the one end of the first cover and the one end of the second cover is assured and the interior component housed in the internal space can be seen through the gap.

(2) Preferably, the engaging mechanisms are provided at upper ends of the first cover and the second cover. The retaining mechanisms are provided at lower ends of the first cover and the second cover.

(3) Preferably, a color of the interior component seen through the gap is different from those of the first cover and second cover.

In accordance with the box having the configuration of the above item (1), if the engagement state of the engaging mechanisms is abnormal, a gap can be assured between the one end of the first cover and the one end of the second cover, through which the inside can be seen. For this reason, in this state, even if the retaining mechanisms at the other ends fall in an engagement state, by seeing that there is the gap by eyes, it can be detected that the fitting state between the first cover and second cover is a semi-fitting state.

Specifically, even if the engaging mechanisms are not correctly engaged, if the retaining mechanisms are erroneously engaged, owing to this engagement, it is erroneously determined that the upper cover and the lower cover are normally fit to each other. Thus, although the present state is actually an semi-fitting state, this may be overlooked. However, in the box having the configuration identified in the above item (1), where the engaging mechanisms are not correctly engaged, such a setting as daring to open the gap between the one end of the first cover and the one end of the second cover is done. So, by seeing the gap, it can be easily confirmed by eyes that the present state is the semi-fitting state, thereby preventing overlooking of the semi-fitting. Accordingly, the electric junction block can be assembled with reliability.

In accordance with the box having the configuration identified in the item (2), since the gap is formed between the upper end of the first cover and the upper end of the second cover, by doing a normal assembling work while seeing from above, the semi-fitting between both covers can be easily detected.

In accordance with the box having the configuration identified in the above item (3), the color of the interior component seen through the gap is made different from those of the first cover and second cover. For this reason, not only the gap is opened, but also the member with a different color from that of the outer covers can be seen so that the semi-fitting between both covers can be easily detected. Additionally, if the first cover and second cover are colored in the same color, it can be confirmed that this color is obviously different from the color of the interior component. Therefore, it is desirable that the first cover and second cover are colored in the same color.

In accordance with this invention, if the semi-fitting occurs, since the inside can be seen from the gap between the covers, it can be detected immediately by eyes that the present state is the semi-fitting state, thereby preventing overlooking of the semi-fitting.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinbelow, a detailed explanation will be given of a preferred embodiment of this invention.

Figure 1:
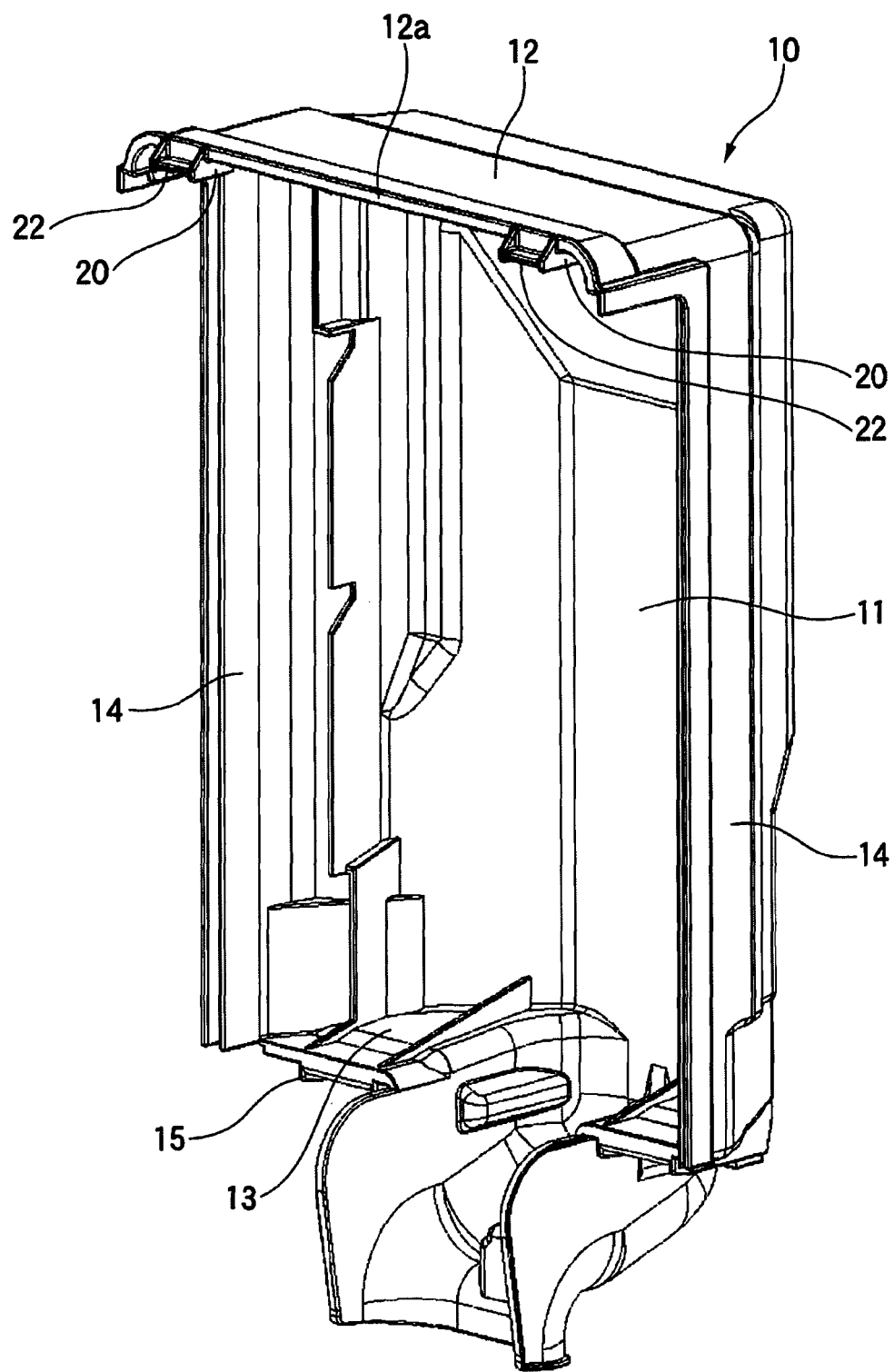
FIG. 1 is a perspective view of an upper cover (first cover) constituting the electric junction block according to an embodiment of this invention when it is seen from inside.
Figure 2:
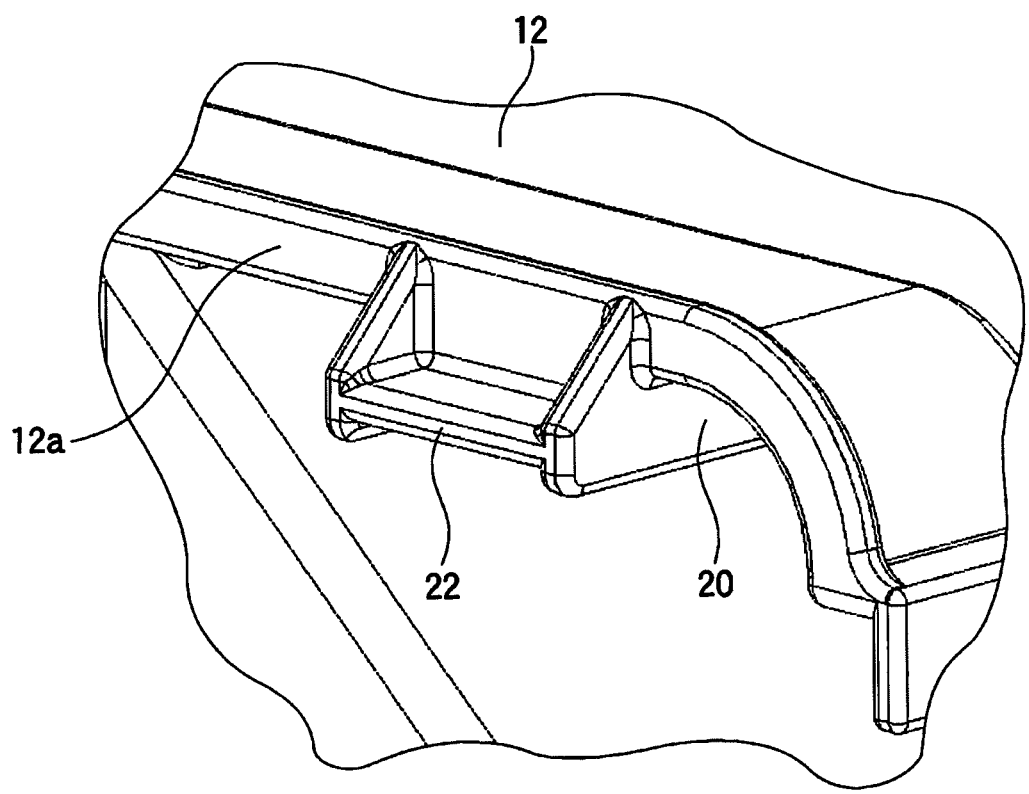
FIG. 2 is a partially enlarged perspective view of the upper cover in FIG. 1.
Figure 3:
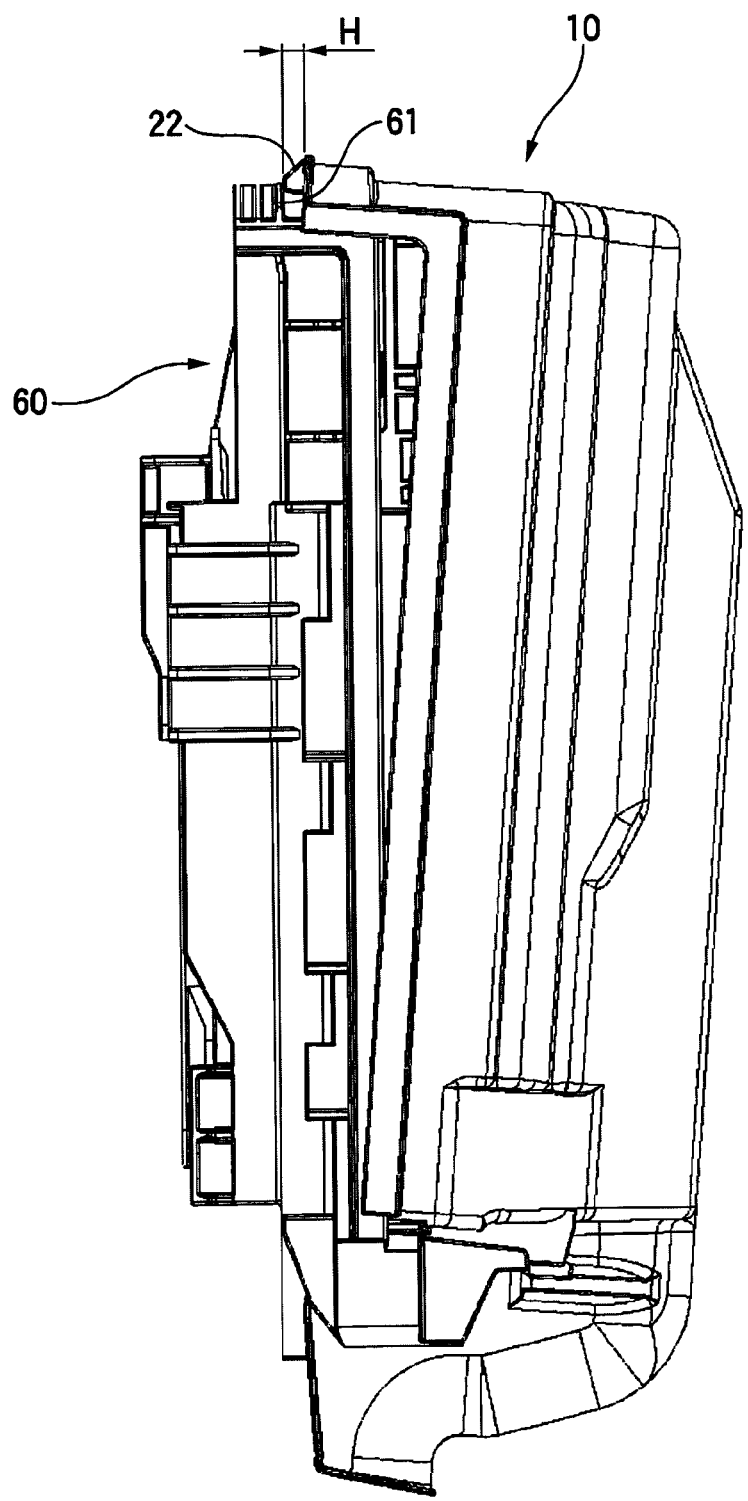
FIG. 3 is a side view of the case where the assembling state when the upper cover is assembled with a lower cover (second cover) is a semi-fitting state, i.e. showing the situation in which a gap H is opened between the upper ends of the upper cover and lower cover.
Figure 4:
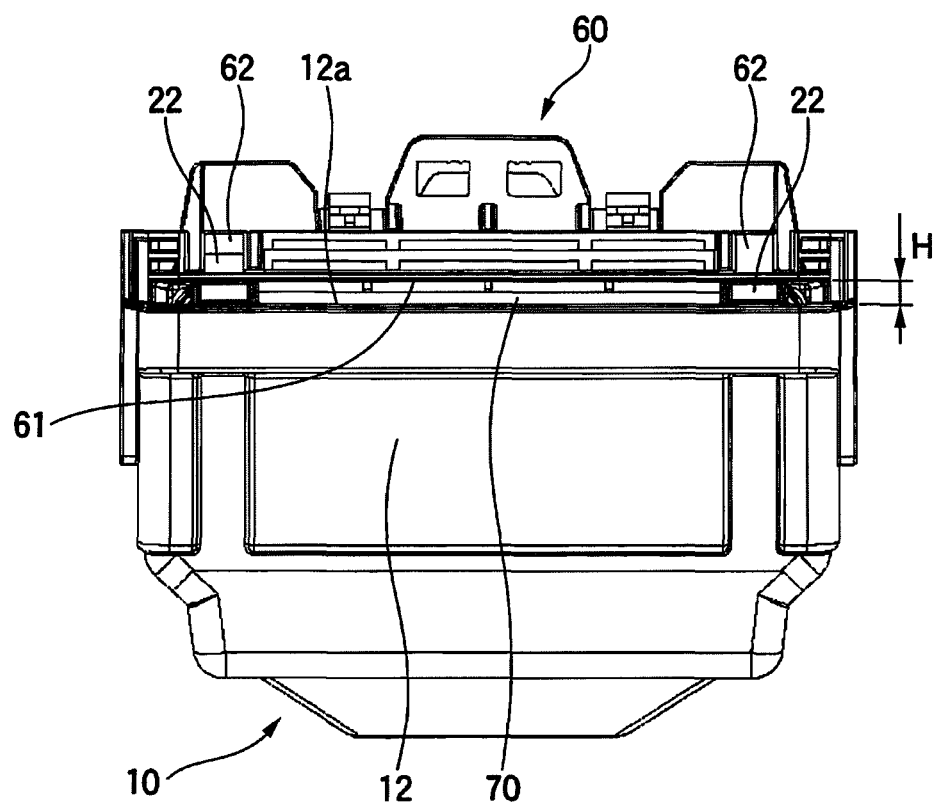
FIG. 4 is a top view when the state of FIG. 3 is seen from above.
Figure 5:
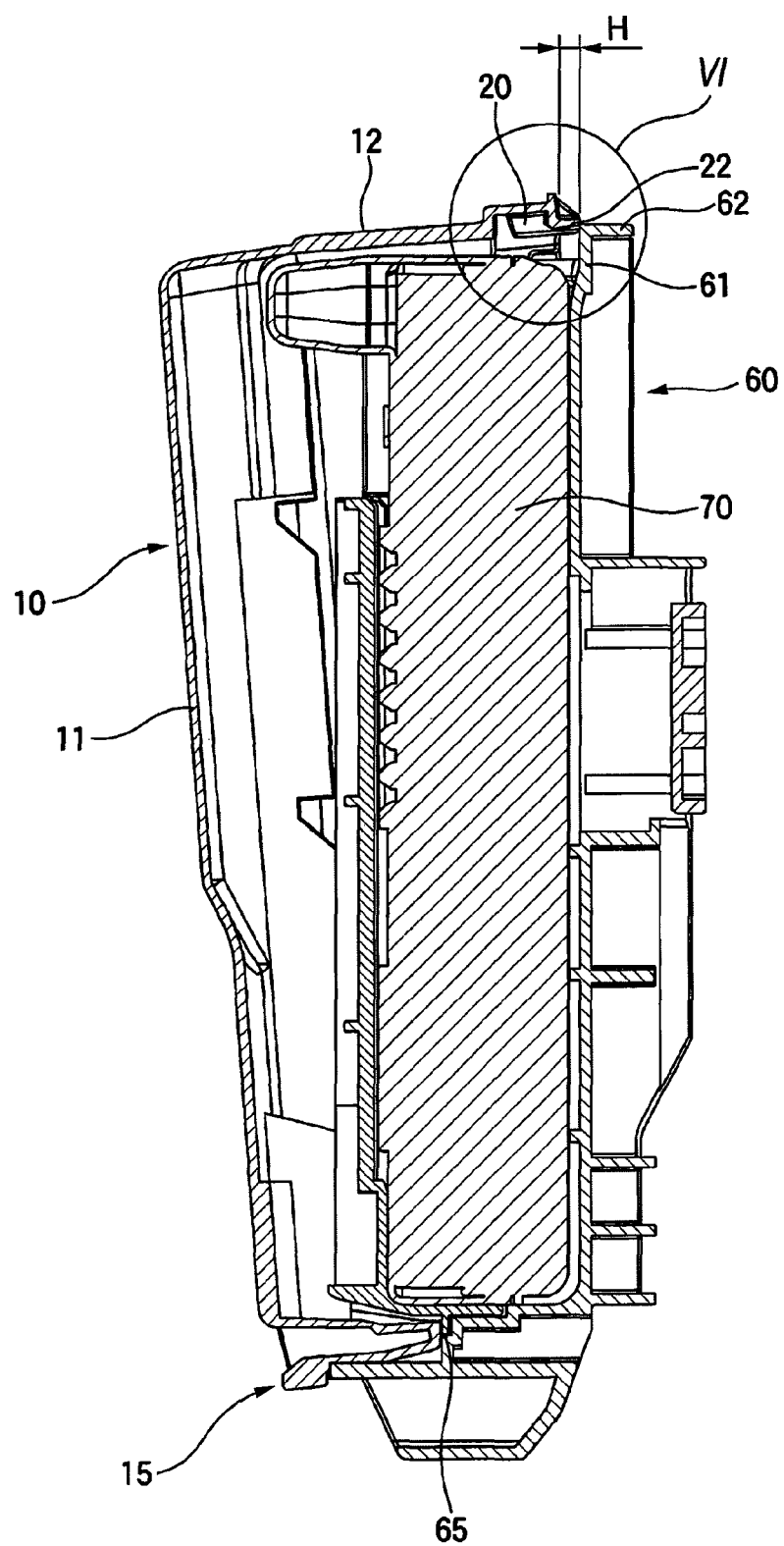
FIG. 5 is a side sectional view of the same state as FIG. 3.
Figure 6:
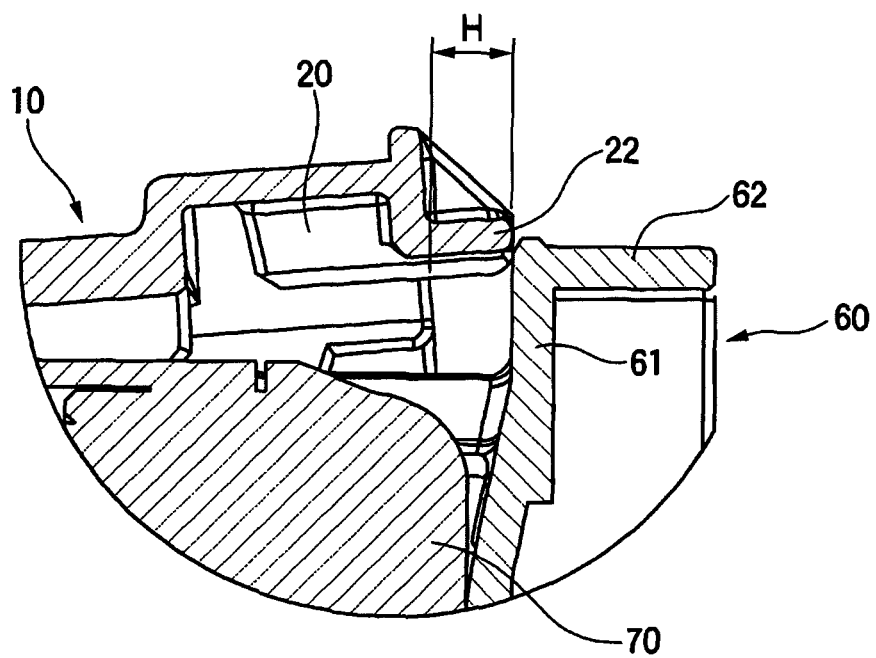
FIG. 6 is an enlarged view of a section of VI in FIG. 5.

FIGS. 1 to 6 are views for explaining an electric junction block according to an embodiment of this invention. FIG. 1 is a perspective view of an upper cover (first cover) constituting the electric junction block when it is seen from inside. FIG. 2 is a partially enlarged perspective view of the upper cover in FIG. 1. FIG. 3 is a side view of the case where the assembling state when the upper cover is assembled with a lower cover (second cover) is a semi-fitting state, i.e. showing the situation in which a gap H is opened between the upper ends of the upper cover and lower cover. FIG. 4 is a top view when the state of FIG. 3 is seen from above. FIG. 5 is a side sectional view of the same state as FIG. 3. FIG. 6 is an enlarged view of a section of VI in FIG. 5.

Figure 7:
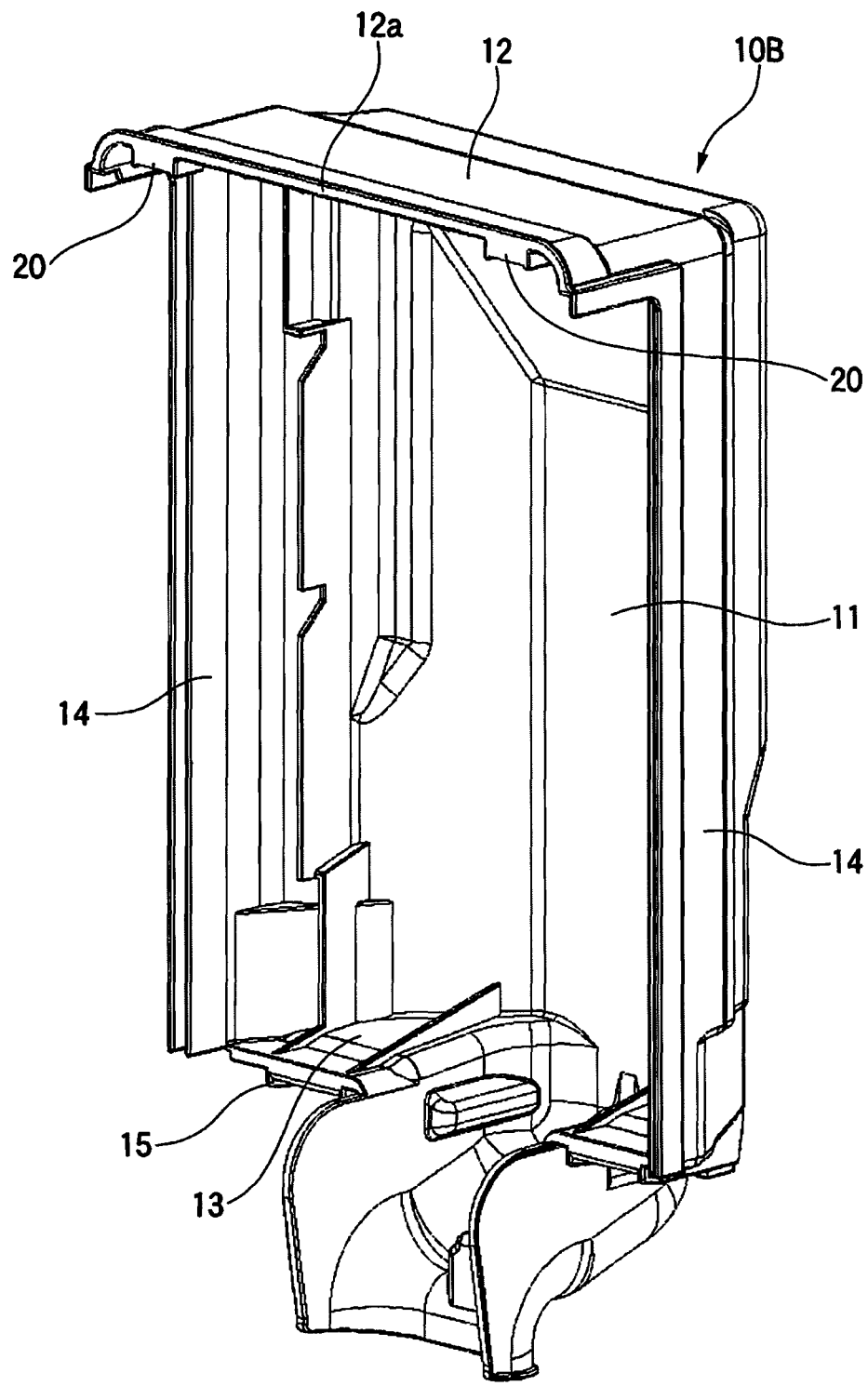
FIG. 7 is a perspective view of an upper cover in the electric junction block according to a comparative example which is a premise of the electric junction block according to the above embodiment, when it is seen from inside.
Figure 8:
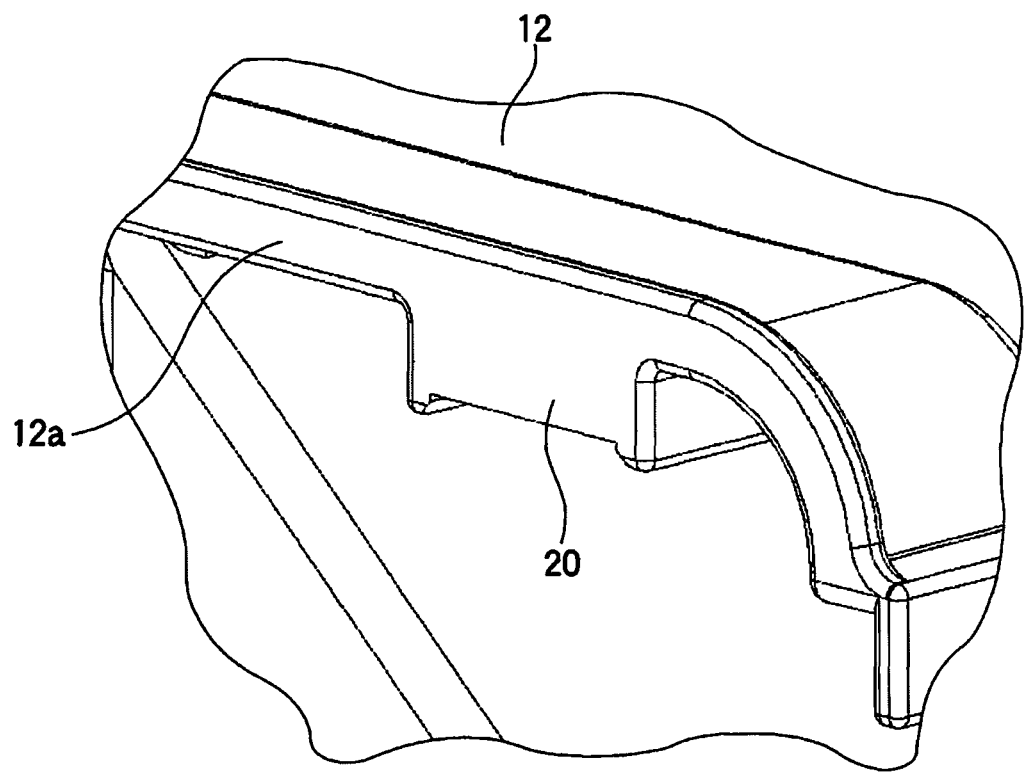
FIG. 8 is a partially enlarged perspective view of the upper cover in FIG. 7.
Figure 9:
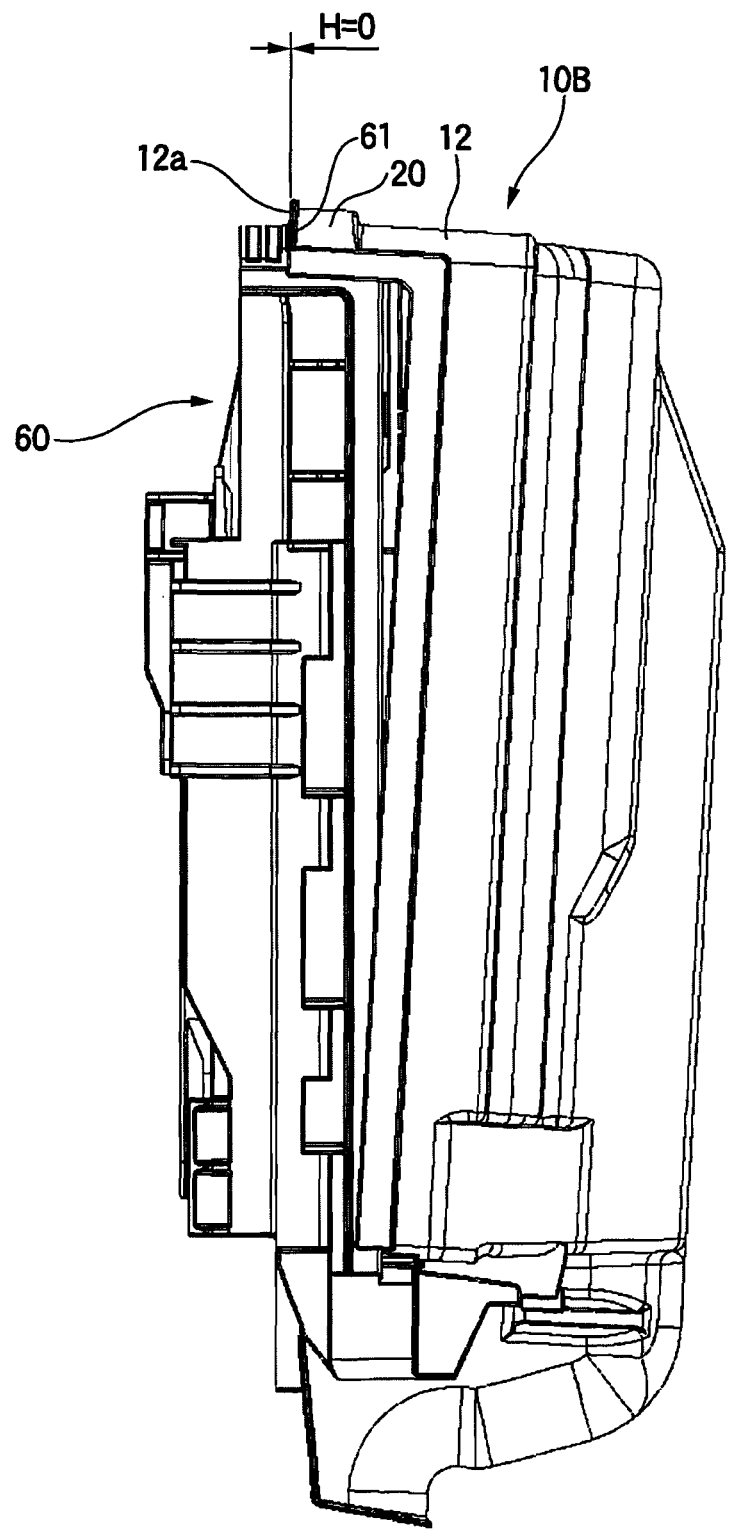
FIG. 9 is a side view of the case where the assembling state when the upper cover in FIG. 7 is assembled with a lower cover is a semi-fitting state, i.e. showing the state where a gap H is not opened between the upper ends of the upper cover and lower cover (when H=0)
Figure 10:
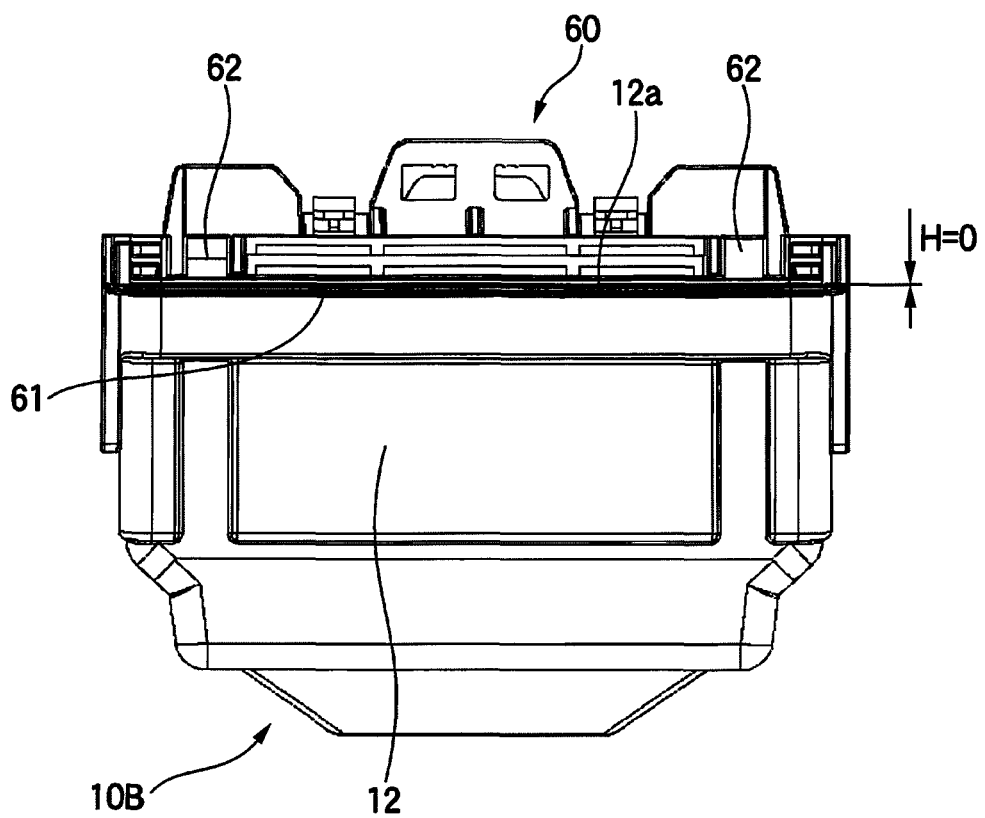
FIG. 10 is a top view when the state of FIG. 8 is seen from above.

Further, FIGS. 7 to 12 are views for explaining the electric junction block according to a comparative example which is a premise of the electric junction block according to the above embodiment. FIG. 7 is a perspective view of an upper cover in the electric junction block when it is seen from inside. FIG. 8 is a partially enlarged perspective view of the upper cover in FIG. 7. FIG. 9 is a side view of the case where the assembling state when the upper cover in FIG. 7 is assembled with a lower cover is a semi-fitting state, i.e. showing the state where a gap H is not opened between the upper ends of the upper cover and lower cover (when H=0). FIG. 10 is a top view when the state of FIG. 8 is seen from above.

Figure 11A:
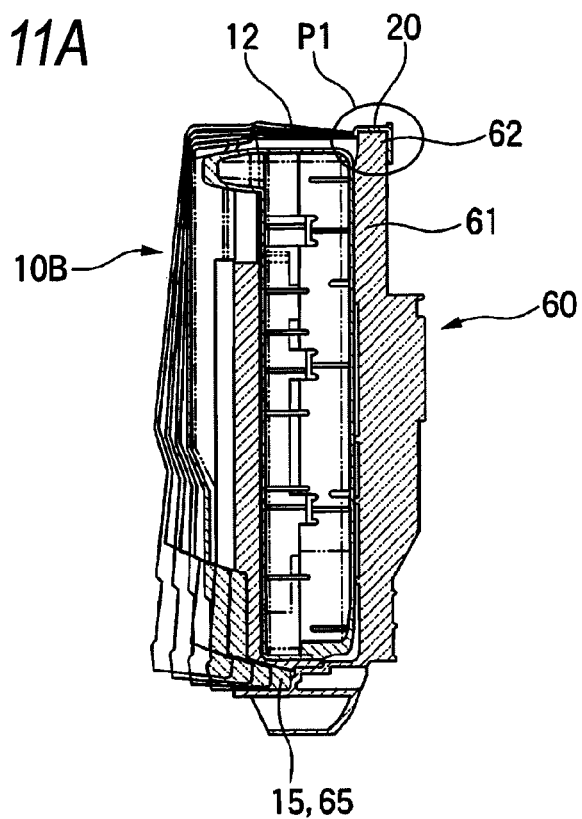
FIGS. 11A and 11B are side sectional views showing the state where these kinds of upper cover and lower cover are normally fit to each other and the state where they are abnormally fit to each other (semi-fitting state), respectively.
Figure 11B:
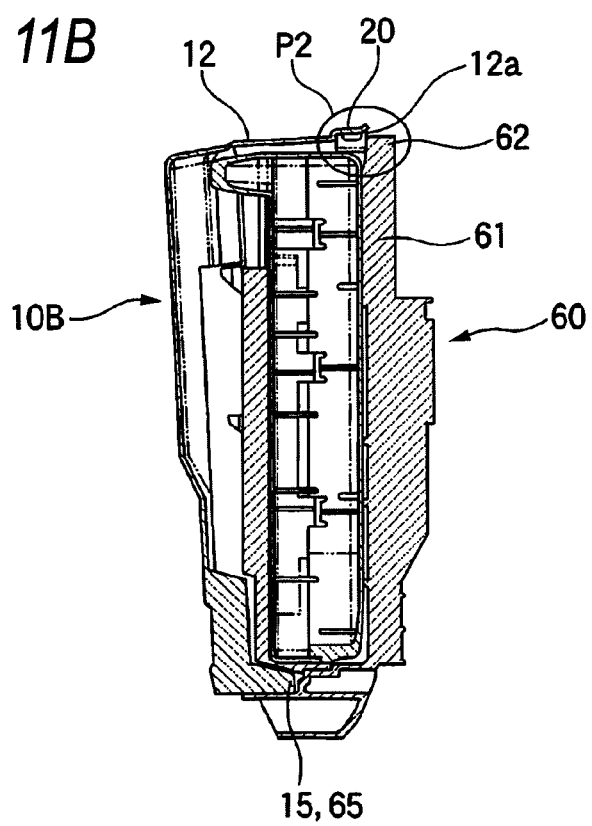
Figure 12A:
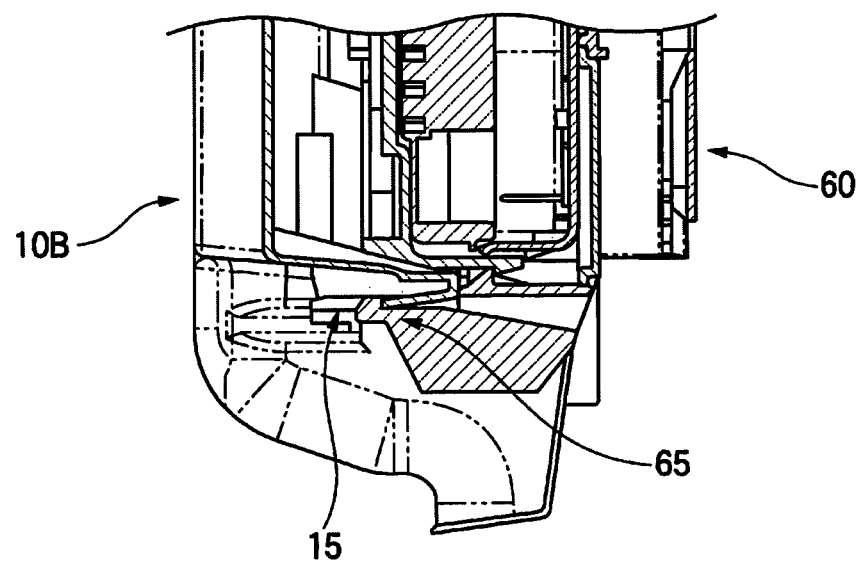
FIGS. 12A and 12B are enlarged views of the lower ends of FIGS. 11A and 11B, respectively.
Figure 12B:
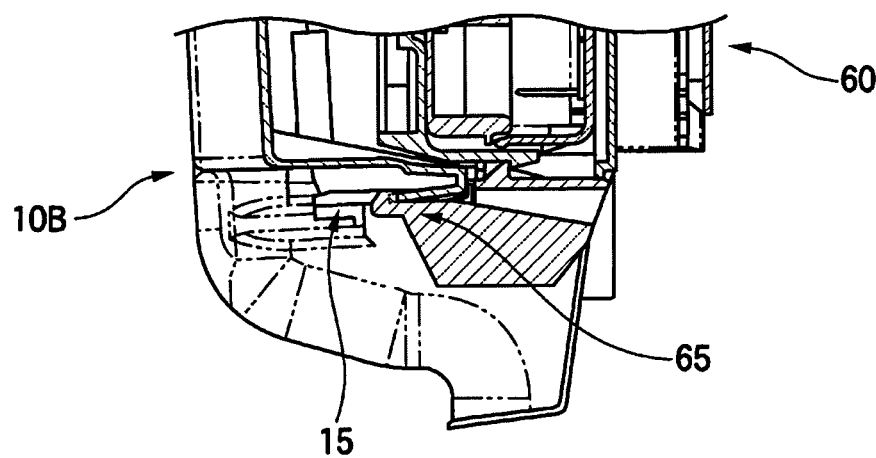

FIGS. 11A and 11B are side sectional views showing the state where these kinds of upper cover and lower cover are normally fit to each other and the state where they are abnormally fit to each other (semi-fitting state), respectively. FIGS. 12A and 12B are enlarged views of the lower ends of FIGS. 11A and 11B, respectively.

First, referring all the drawings of FIGS. 1 to 12, the part common to the embodiment and comparative example will be explained and next, a different part therebetween will be explained. These electric junction boxes include an upper cover (first cover) 10, 10B, a lower cover (second cover) 60 and an interior component 70 housed in an internal space formed when the upper cover 10, 10B and the lower cover 60 are fit to each other. Differences between the embodiment and the comparative example reside in that the structures of the upper covers 10 and 10B are different partially from each other, and in the embodiment, the color (whitish color) of the interior component 70 is made different from the colors (dark color such as a blackish color) of the upper cover 10 and the lower cover 60.

First, the common part will be described. The upper cover 10, 10B is formed in a square box shape which includes a vertically-long rectangular front wall 11, an upper wall 12 extending from its upper side, a lower wall 13 extending from its lower side, and left and right side walls 14 extending from its left and right sides. The upper cover 10, 10B has, at its upper end, a pair of engaging pieces (engaging mechanisms) 20 to be engaged with the upper end of the lower cover 60 and at its lower end, a pair of retaining pieces (retaining mechanisms) 15, which are away from each other in a right-and-left width direction.

The lower cover 60 includes a rectangular base plate 61 to the front of which an interior component 70 is fixed; engaged pieces 62 provided at the upper end of the base plate 61 and to be engaged with the engaging pieces 20 at the upper end of the upper cover 10, 10B so that one of both upper ends is retained to the other thereof; and retained pieces 65 provided at the lower end of the base plate 61 and to be engaged with the retaining pieces 15 at the lower end of the upper cover 10, 10B so that one of both lower ends is retained to the other thereof at the lower end of the base plate 61.

The end edge of the upper cover 10, 10B at the portion mating with the lower cover 60 is adapted to fit in the outside of the peripheral edge of the base plate 61 of the lower cover 60. Particularly, the front end edge (end edge projecting toward the lower cover 60) 12a of the upper side wall 12 of the upper cover 10, 10B fits to overlie the upper edge of the base plate 61 of the lower cover 60.

As shown at a circle of P1 in FIG. 11A, the engaging piece 20 at the upper end of the upper cover 10B is engaged with the engaged piece 62 at the upper end of the lower cover 60 so as to overlie from above, thereby realizing an appropriate engagement state. Thus, as shown in FIG. 12A, the retaining piece 15 at the lower end of the upper cover 10B can be appropriately engaged with the retained piece 65 at the lower end of the lower cover 60. This fact is also common to the electric junction block according to the embodiment of this invention.

Next, an explanation will be given of a problem occurring in the comparative example.

As shown in FIG. 7, in the upper cover 10B of the electric junction block according to the comparative example, the front end edge 12a of the upper side wall 12 does not have any projection, but is entirely linear. Thus, as shown in FIG. 8, the engaging piece 20 has a shape cut at the position of the front end edge 12a.

Therefore, as shown in FIGS. 9, 10 and at a circle of P2 in FIG. 11B, where the engaging piece 20 of the upper cover 10B is not correctly engaged with the engaged piece 62 of the lower cover 60, the front end edge 12a of the upper side wall 12 is likely to be in intimate contact with the front face of the base plate 61 of the lower cover 60 (gap H=0). In this state, no gap is given between the upper cover 10B and the lower cover 60. So, this state is likely to be erroneously determined as if the engaging piece 20 correctly fits to the engaged piece 62.

Usually, if the engaging piece 20 at the upper end is not correctly engaged with the engaged piece 62, as shown in FIG. 12B, the position of the retaining piece 15 will shift slightly downward for the retained piece 65 so that the retaining piece 15 is not easily engaged with the retained piece 65. However, owing to the elasticity of the upper cover 10B and lower cover 60 which are resin products, if the upper cover 10B is pushed forcibly strongly for the lower cover 60, as the case may be, the retaining piece 15 will be engaged with the retained piece 65.

In this case, although the engaging piece 20 and the engaged piece 62, which are upper engaging mechanisms, are not properly engaged with each other, engagement between the retaining piece 15 and the retained piece 65, which are lower retaining mechanisms, has been formed. For this reason, although the present state is actually an improper mounting state (semi-fitting state), this may be overlooked.

In order to obviate such an inconvenience, in the electric junction block according to the embodiment of this invention, as shown in FIGS. 1 and 2, at the front end edge 12a of the upper side wall 12 of the upper cover 10, projections 22 are provided particularly at the front ends of the pair of engaging pieces 20. These two projections 22, if the engaging pieces 20 are not correctly engaged with the engaged pieces 62, hit against the front face of the base plate 61 of the lower cover 60. In this way, as shown in FIGS. 3 to 6, a gap H is assured between the front end edge 12a of the upper side wall 12 of the upper cover 10 and the front face of the base plate 61 of the lower cover 60, thereby permitting the interior component 70 internally housed to be seen from the outside. If the engaging pieces 20 are normally engaged with the engaged pieces 62, these projections 22 do not interfere with the lower cover 60 side.

Accordingly, as described above, the gap H can be formed through which a different color of the interior component 70 can be seen. Thus, even if the retaining mechanisms (retaining piece 15 and retained piece 65) fall in an engagement state, it can be detected that the engaging piece 20 of the upper cover 10 is not correctly engaged with the engaged piece 62 of the lower cover 60 and so the fitting state of the upper cover 10 is the semi-fitting state.

Specifically, even if the engaging mechanisms (engaging piece 20 and engaged piece 62) are not correctly engaged, if the retaining mechanisms (retaining piece 15 and retained piece 65) are engaged, owing to this engagement, it is erroneously determined that the upper cover 10 and the lower cover 60 are correctly fit to each other. Thus, although the present state is actually the semi-fitting state, this may be overlooked. However, in the embodiment of this invention, where the engaging mechanisms (engaging piece 20 and engaged piece 62) are not correctly engaged, since the color of the interior component 70 internally housed can be seen through the gap H between the upper cover 10 and the lower cover 60, it can be confirmed that the present state is the semi-fitting state by only seeing from above, thereby preventing overlooking of the semi-fitting. Accordingly, the electric junction block can be assembled with reliability.

Additionally, this invention should not be limited to the embodiment described above, but can be appropriately modified or improved. Further, the material, shape, size, number and location of each component in this embodiment described above should not be limited as long as this invention can be accomplished.

For example, in the above embodiment, the projections 22 for assuring the gap were provided on the upper cover 10 side, but the projections having the same function may be provided on the lower cover 60 side. Further, the projections having the same function may be provided on both upper cover 10 and lower cover 60.

Further, in the embodiment described above, it was proposed that the engaging mechanisms (engaging piece 20 and engaged piece 62) are provided at the upper end of the electric junction block whereas the retaining mechanisms (retaining piece 15 and retained piece 65) are provided at the lower end of the electric junction block. However, in the case of a horizontally-long electric junction block, the engaging mechanisms and the retaining mechanisms may be provided at the right and left ends. Further, it is theoretically permitted that the engaging mechanisms (engaging piece 20 and engaged piece 62) are provided at the lower end of the electric junction block whereas the retaining mechanisms (retaining piece 15 and retained piece 65) are provided at the upper end of the electric junction block. However, mostly, an actual work is done while turning a worker's gaze from above so that even if the gap is formed on the lower side, it is hard to look. Therefore, this is not so desirable.

Although the invention has been illustrated and described for the particular preferred embodiments, it is apparent to a person skilled in the art that various changes and modifications can be made on the basis of the teachings of the invention. it is apparent that such changes and modifications are within the spirit, scope, and intention of the invention as defined by the appended claims.

The present application is based on Japan Patent Application No. 2008-022817 filed on Feb. 1, 2008, the contents of which are incorporated herein for reference.

What is claimed is:

1. A box comprising:
a first cover made of resin, including a front wall, an upper wall extending from an upper side of the front wall, a lower wall extending from a lower side of the front wall, and a pair of side walls extending from opposite longitudinal sides of the front wall, which connect the upper wall to the lower wall, thereby forming a generally rectangular shape;
a second cover made of resin and configured to fit to the first cover, the second cover including a base plate; and
an interior component fixed to an interior side of the base plate so as to be housed in an internal space formed when the first cover and second cover are fit to each other,
wherein the first cover includes an engaging portion disposed at an edge of the upper side of the front wall and a retaining portion disposed at the lower side of the front wall, and the second cover includes an engaged portion at an uppermost end of the base plate and a retained portion at the lower end of the base plate,
wherein the first cover and the second cover are configured such that the first cover fits to the second cover by (1) engaging the engaging portion of the first cover with the engaged portion of the second cover, (2) rotating the first cover about the engaging portion which is engaged with the engaged portion so that the retaining portion approaches the retained portion, and then (3) retaining the retaining portion of the first cover with the retained portion of the second cover, and
wherein a projection extends from the engaging portion, the engaging portion is configured to slide over and overlap an outer surface of the uppermost end of the base plate so as to engage the engaged portion, and the projection is configured to form a gap between a front edge of the upper wall of the first cover and the uppermost end of the base plate of the second cover when the projection abuts the uppermost end of the base plate while the retaining portion of the first cover is normally retained to the retained portion of the second cover, the gap through which the interior component housed in the internal space can be seen from the outside of the box.

2. The box according to claim 1, wherein a color of the interior component is different from those of the first cover and second cover.

3. The box according to claim 1, wherein the engaging portion of the first cover comprises a pair of engaging pieces, and the engaged portion of the second cover comprises a pair of engaged pieces so as to positionally-correspond to the pair of engaging pieces.

4. The box according to claim 1, wherein the engaging portion protrudes downward from the edge of the upper side of the front wall of the first cover, toward the interior of the box, and the projection protrudes directly from a front end of the engaging portion in a same direction as a direction in which the upper wall extends away from the upper side of the front wall.

* * * * *